United States Patent
Li et al.

(10) Patent No.: US 10,059,049 B2
(45) Date of Patent: Aug. 28, 2018

(54) DEVICE AND METHOD FOR NOZZLE ADJUSTMENT

(71) Applicants: Inventec Appliances (Pudong) Corporation, Shanghai (CN); Inventec Appliances Corp., New Taipei (TW); Inventec Appliances (Shanghai) Co., Ltd., Shanghai (CN)

(72) Inventors: Ji-Xin Li, Shanghai (CN); Ting-Wei Zhang, Shanghai (CN); Yu Zhang, Shanghai (CN); Shih-Kuang Tsai, Shanghai (CN)

(73) Assignees: Inventec Appliances (Pudong) Corporation, Shanghai (CN); Inventec Appliances Corp., New Taipei (TW); Inventec Appliances (Shanghai) CVo., Ltd., Shanghai (CN)

( * ) Notice: Subject to any disclaimer, the term of this patent is extended or adjusted under 35 U.S.C. 154(b) by 458 days.

(21) Appl. No.: 14/828,528

(22) Filed: Aug. 18, 2015

(65) Prior Publication Data

US 2016/0121535 A1 May 5, 2016

(30) Foreign Application Priority Data

Nov. 3, 2014 (CN) .......................... 2014 1 0610295

(51) Int. Cl.
*B29C 64/209* (2017.01)
*B29C 64/232* (2017.01)
(Continued)

(52) U.S. Cl.
CPC ........ *B29C 47/065* (2013.01); *B29C 47/0002* (2013.01); *B29C 47/0806* (2013.01); *B29C 47/0864* (2013.01); *B29C 47/12* (2013.01); *B29C 64/209* (2017.08); *B29C 64/227* (2017.08); *B29C 64/232* (2017.08);
(Continued)

(58) Field of Classification Search
CPC .............. B29C 47/0002; B29C 47/065; B29C 47/0806; B29C 47/0864; B29C 47/12; B29C 64/106; B29C 64/118; B29C 64/20; B29C 64/209; B29C 64/227; B29C 64/232; B29C 64/236; B29C 64/245; B33Y 30/00; B33Y 50/02
See application file for complete search history.

(56) References Cited

U.S. PATENT DOCUMENTS 9,314,970 B2 * 4/2016 Elsworthy ........... B29C 67/0059
9,808,986 B2 * 11/2017 Toh ....................... B29C 64/106
(Continued)

*Primary Examiner* — Yogendra N Gupta
*Assistant Examiner* — Joseph S Leyson
(74) *Attorney, Agent, or Firm* — CKC & Partners Co., Ltd.

(57) ABSTRACT

A nozzle adjustment device for a three-dimensional forming equipment assembly includes a first guiding block, a second guiding block, and a moving block. The first guiding block has a first inclined surface and a first bottom surface which is parallel to a printing platform. The first inclined surface and the first bottom surface form an acute angle therebetween. The second guiding block has a second inclined surface. The moving block is located between the first guiding block and the second guiding block. The moving block has a third inclined surface, a fourth inclined surface, and a second bottom surface. The second bottom surface is parallel to the printing platform, and has a nozzle disposed thereon.

11 Claims, 2 Drawing Sheets

(51) Int. Cl.
*B29C 64/236* (2017.01)
*B29C 47/06* (2006.01)
*B33Y 30/00* (2015.01)
*B29C 64/227* (2017.01)
*B29C 67/00* (2017.01)
*B33Y 50/02* (2015.01)
*B29C 47/00* (2006.01)
*B29C 47/08* (2006.01)
*B29C 47/12* (2006.01)
*B29L 31/00* (2006.01)

(52) U.S. Cl.
CPC ........ *B29C 64/236* (2017.08); *B29C 67/0059* (2013.01); *B29C 67/0085* (2013.01); *B29C 67/0088* (2013.01); *B33Y 30/00* (2014.12); *B33Y 50/02* (2014.12); *B29L 2031/00* (2013.01)

(56) References Cited

U.S. PATENT DOCUMENTS

| | | | |
|---|---|---|---|
| 2009/0035405 A1* | 2/2009 | Leavitt | B29C 47/0021 425/97 |
| 2010/0021580 A1* | 1/2010 | Swanson | B29C 31/042 425/132 |
| 2012/0164256 A1* | 6/2012 | Swanson | B29C 67/0055 425/162 |
| 2015/0037446 A1* | 2/2015 | Douglass | B29C 67/0055 425/131.1 |
| 2017/0210033 A1* | 7/2017 | Overgaauw | B29C 31/044 |

* cited by examiner

DEVICE AND METHOD FOR NOZZLE ADJUSTMENT

RELATED APPLICATIONS

This application claims priority to China Application Serial Number 201410610295.4, filed Nov. 3, 2014, which is herein incorporated by reference.

BACKGROUND

Technical Field

The present disclosure relates to a three-dimensional printing technique. More particularly, the present disclosure relates to a nozzle adjustment device and method for a three-dimensional forming equipment assembly (such as a three-dimensional printer), and also relates to an equipment and a method for three-dimensional forming.

Description of Related Art

A three-dimensional printer is a printer based on a digital model, which uses adhesive materials to construct an object by printing layer by layer. Three-dimensional printers have been widely used in the fields such as mold fabrication and industrial designs.

With rapid development of the three-dimensional printing technique, in order to achieve a faster printing speed, a printer adopting two or more nozzles has been increasingly emphasized and used.

In a conventional three-dimensional printer, the design of nozzle location is to fix plural nozzles on the same reference plane. This design will cause errors in either machining or assembling, i.e., the elevations of the nozzles cannot be guaranteed to be completely the same. In a practical printing process, only one of the multiple nozzles is doing the printing work, and the others of the multiple nozzles are idling and synchronously moved together with the working nozzle along a printing direction. Consequently, when one nozzle is printing, the other nozzles may likely scrape against a printed object (i.e., the material injected from the working nozzle). Whenever higher printing precision is required, the probability of the printed object getting scraped is higher, thus resulting in material accumulation caused by the nozzles scraping against the printed object, a rough surface of the printed object due to scrape damage, decreased quality of the printed object, decreased printing efficiency, and the waste of material and working hours. For example, as shown in FIG. 1, a nozzle A and a nozzle B are located in the same horizontal plane. The heights of nozzle A and nozzle B away from the printing platform 1 are the same. The thickness of injected material 2 is about 0.2-0.4 mm. The discharge diameter of each of the nozzles A and B is 0.4 mm. When the nozzle A injects material, the nozzle B synchronously moves along a moving direction of the nozzle A. Because the injected material 2 from the nozzle A is not flat during solidification, a height difference between the nozzle A and the nozzle B will be caused, and thus the nozzle B may scrape against the surface of a printed object printed by the nozzle A.

Therefore, the design of three-dimensional printers with multiple nozzles needs to be further improved.

SUMMARY

A technical aspect of the present disclosure provides a nozzle adjustment device, a nozzle adjustment method and a three-dimensional forming equipment assembly, so as to avoid the problems of material accumulation caused by the nozzles scraping against a printed object, a rough surface on the printed object due to scrape damage, decreased quality of the printed object, decreased printing efficiency, and the waste of material and working hours during a three-dimensional forming process.

According to an embodiment of the present disclosure, a nozzle adjustment device for a three-dimensional forming equipment assembly is provided. The nozzle adjustment device includes a first guiding block, a second guiding block and a moving block. The first guiding block has a first inclined surface and a first bottom surface which is parallel to a printing platform. The first inclined surface and the first bottom surface form an acute angle therebetween. The second guiding block has a second inclined surface. The moving block is located between the first guiding block and the second guiding block. The moving block has a third inclined surface, a fourth inclined surface, and a second bottom surface which is parallel to the printing platform and has a nozzle disposed thereon.

According to an embodiment of the present disclosure, a nozzle adjustment method for a three-dimensional forming equipment assembly suitable for the nozzle adjustment device is provided. The nozzle adjustment method includes the following steps (it is appreciated that the sequence of the steps and the sub-steps as mentioned below, unless otherwise specified, all can be adjusted according to actual needs, or even executed at the same time or partially at the same time):

(1) controlling a displacement of the moving block between the first guiding block and the second guiding block, so as to allow the nozzle installed on the second bottom surface of the moving block to carry out printing when a distance between the second bottom surface of the moving block and the printing platform is a shortest limiting distance; and (2) moving the moving block between the first guiding block and the second guiding block after the nozzle installed on the second bottom surface of the moving block stops printing, so as to make the distance between the second bottom surface of the moving block and the printing platform greater than the shortest limiting distance.

According to an embodiment of the present disclosure, a three-dimensional forming equipment assembly includes a frame, a printing platform, a motor assembly, and a nozzle assembly. The nozzle assembly is connected to the motor assembly. The nozzle assembly includes the nozzle adjustment device and at least two nozzles including a first nozzle and a second nozzle.

When compared with the prior art, the aforementioned embodiments of the present disclosure have the advantage that the working nozzle is not required to be lifted up during printing. Thus, when the three-dimensional forming equipment assembly and the three-dimensional forming method based on the nozzle adjustment device and the nozzle adjustment method of the present disclosure are applied, the interference between the nozzle and the printed object during the printing process can be effectively avoided. In addition, the material accumulation and the damage caused by the idling nozzles scraping against the printed object are also avoided. In this manner, the surface of the printed object becomes smooth, the quality of the printed object and the printing efficiency are both increased, and both the material and the time for printing are saved in comparison with the prior art.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
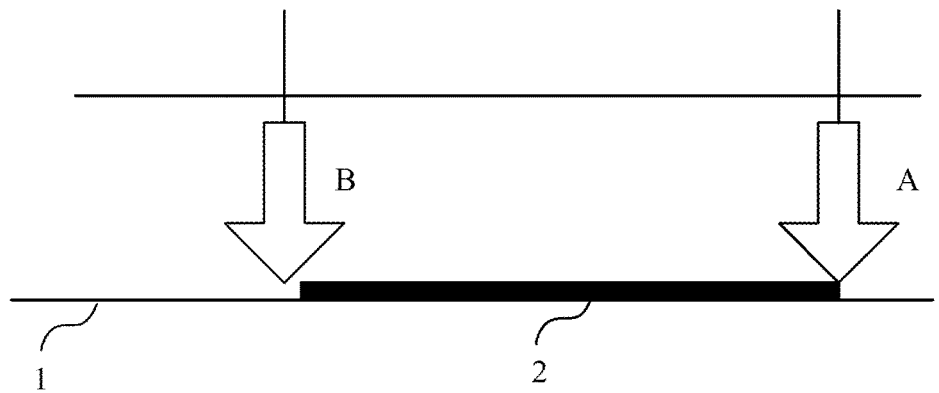
FIG. 1 is a schematic diagram of nozzle positions of an existing three-dimensional printer.

Drawings will be used below to disclose a plurality of embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
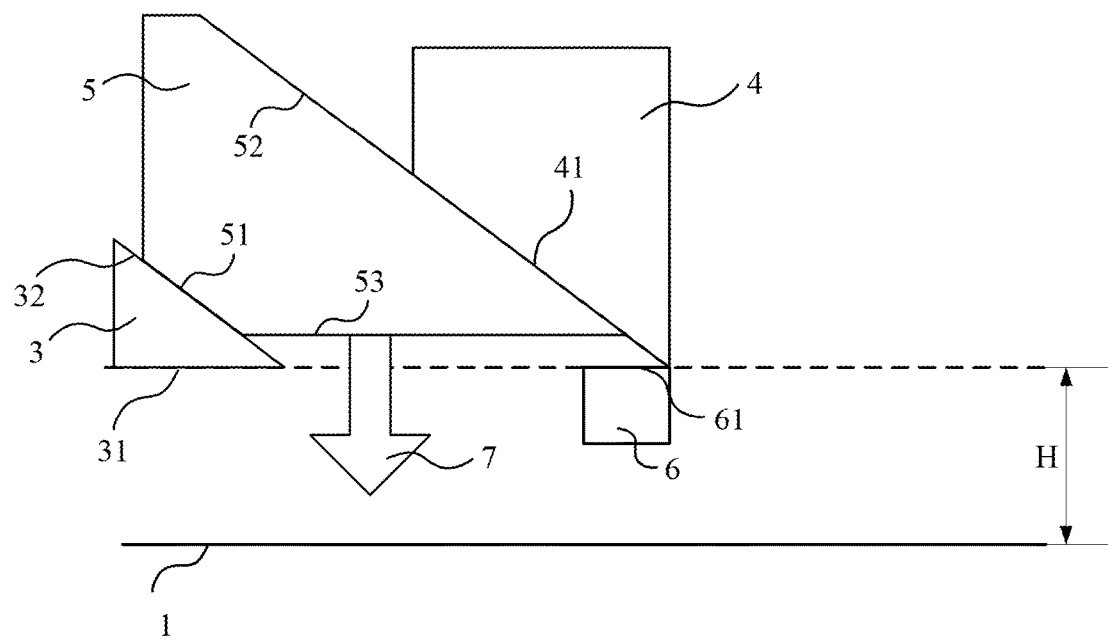
FIG. 2 is a schematic diagram of a nozzle adjustment device according to an embodiment of the present disclosure.

Please refer to FIG. 2. FIG. 2 is a schematic diagram of a nozzle adjustment device according to an embodiment of the present disclosure. As shown in FIG. 2, a nozzle adjustment device for a three-dimensional forming equipment assembly of this embodiment of the present disclosure includes a first guiding block 3, a second guiding block 4, a moving block 5 and a position-limiting device. The first guiding block 3 has a first inclined surface 32 and a first bottom surface 31 which is parallel to a printing platform 1 of a printer. The first inclined surface 32 and the first bottom surface 31 form an acute angle therebetween. The second guiding block 4 has a second inclined surface 41. The moving block 5 is located between the first guiding block 3 and the second guiding block 4. The moving block 5 has a third inclined surface 51, a fourth inclined surface 52, and a second bottom surface 53. The second bottom surface 53 is parallel to the printing platform 1 of the printer and has a nozzle 7 disposed thereon. The first inclined surface 32, the second inclined surface 41, the third inclined surface 51, and the fourth inclined surface 52 are parallel to each other, and the third inclined surface 51 contacts the first inclined surface 32, and the fourth inclined surface 52 contacts the second inclined surface 41. The position-limiting device is configured to limit a shortest limiting distance H between the second bottom surface 53 of the moving block 5 and the printing platform 1. The position-limiting device is a limiting block 6. A top surface 61 of the limiting block 6 is located above the printing platform 1 by the shortest limiting distance H (the dotted line of FIG. 2). When a distance between the second bottom surface 53 of the moving block 5 and the printing platform 1 reaches the shortest limiting distance H, the second bottom surface 53 and the top surface 61 of the limiting block 6 are in contact, such that the moving block 5 does not keep moving downwards. At this point, when the distance between the second bottom surface 53 of the moving block 5 and the printing platform 1 is the shortest limiting distance H, the nozzle 7 is located at a printing position.

In order to drive the displacement of the moving block 5, the nozzle adjustment device further includes a driving device (not shown). The driving device is connected to the moving block 5 and is configured to drive the displacement of the moving block 5 between the first guiding block 3 and the second guiding block 4, such that the second bottom surface 53 of the moving block 5 moves close to or away from the printing platform 1. In a specific embodiment, the driving device includes an electric motor and a driving rod driven by the electric motor. The driving rod is connected to the moving block 5.

With reference to the aforementioned nozzle adjustment device of the printer, an embodiment of the present disclosure further provides a nozzle adjustment method for a three-dimensional forming equipment assembly. The nozzle adjustment method includes the following steps (it is appreciated that the sequence of the steps and the sub-steps as mentioned below, unless otherwise specified, all can be adjusted according to actual needs, or even executed at the same time or partially at the same time):

(1) controlling the displacement of the moving block 5 between the first guiding block 3 and the second guiding block 4, so as to allow the nozzle 7 installed on the second bottom surface 53 of the moving block 5 to carry out printing when the distance between the second bottom surface 53 of the moving block 5 and the printing platform 1 is a shortest limiting distance H, in which, when the distance between the second bottom surface 53 of the moving block 5 and the printing platform 1 is the shortest limiting distance H, the second bottom surface 53 and a top surface of the position-limiting device (the limiting block 6) are in contact;

(2) moving the moving block 5 between the first guiding block 3 and the second guiding block 4 after the nozzle 7 installed on the second bottom surface 53 of the moving block 5 stops printing, so as to make the distance between the second bottom surface 53 of the moving block 5 and the printing platform 1 greater than the shortest limiting distance H.

Figure 3:
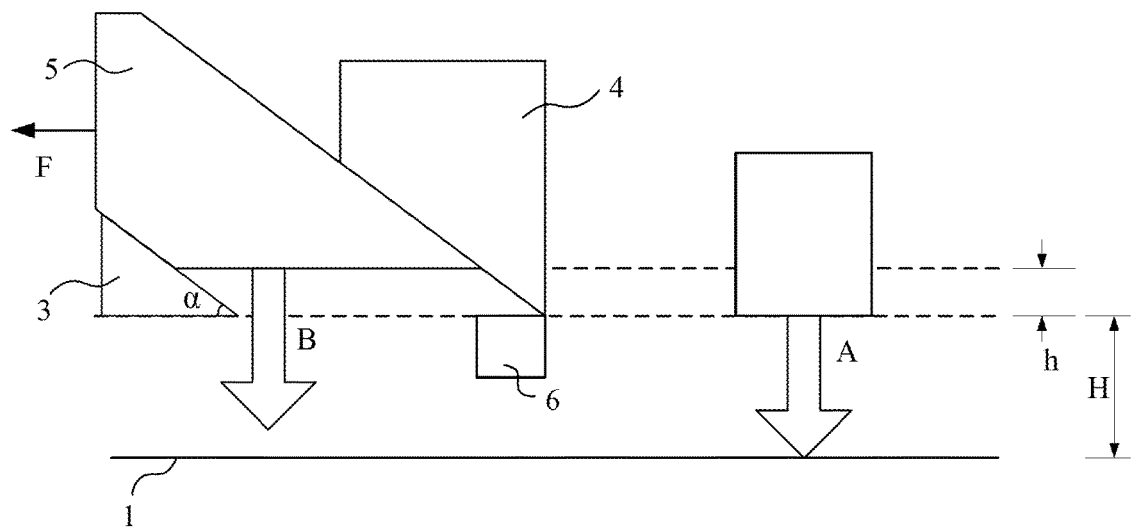
FIG. 3 is a schematic diagram of the nozzle adjustment device of FIG. 2 applied on a three-dimensional forming equipment assembly according to a first embodiment of the present disclosure.
Figure 4:
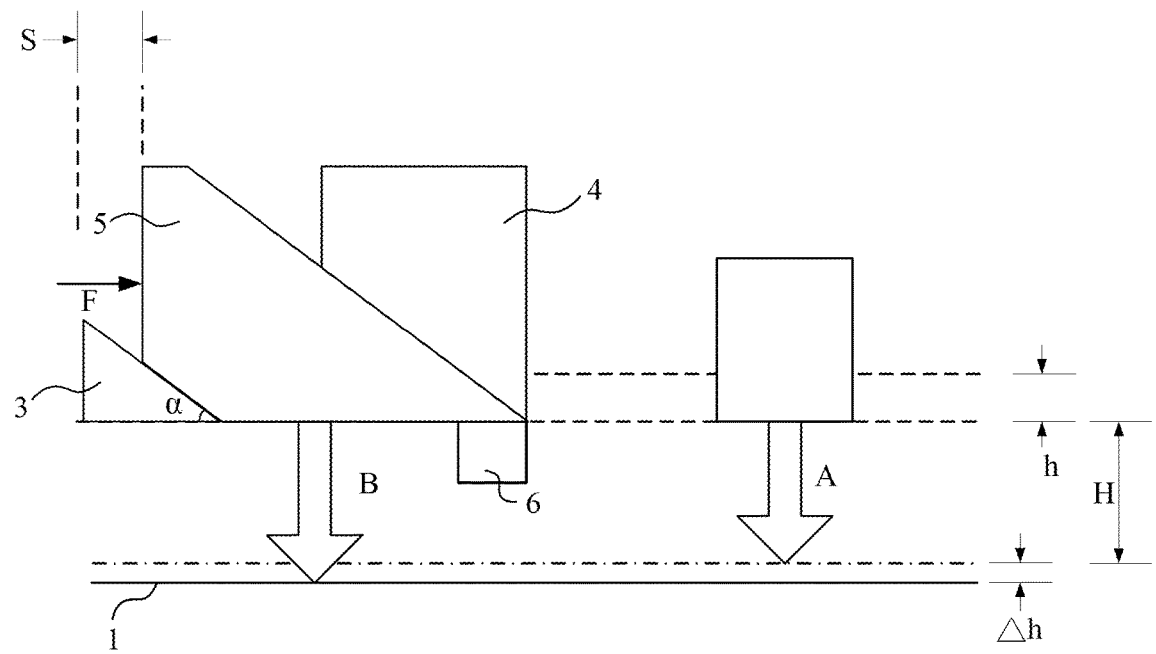
FIG. 4 is a schematic diagram of the nozzle adjustment device of FIG. 2 applied on a three-dimensional forming equipment assembly according to a second embodiment of the present disclosure.

The working status of the nozzle adjustment device of the present disclosure combined with a three-dimensional printer is further illustrated below. Referring to FIG. 3 and FIG. 4, a nozzle B is installed on the nozzle adjustment device of the present disclosure, while a nozzle A is fixed.

As shown in FIG. 3, in the three-dimensional forming equipment assembly (such as a three-dimensional printer with multiple nozzles), the nozzle B is lifted up by the nozzle adjustment device. When the nozzle A performs printing, since the nozzle B is lifted up, the nozzle B does not scrape against a printed object printed by the nozzle A.

As shown in FIG. 4, after the nozzle A finishes printing, the nozzle B is used for printing. When an external force F (by the driving device) is exerted, the moving block 5 moves downwards along the first inclined surface 32 of the first guiding block 3. The horizontal displacement distance can be calculated by the following equation:

$$S = h/\tan \alpha$$

where S is the distance of the horizontal displacement of the moving block 5, h is the distance of the vertical displacement of the moving block 5, and α is the angle between the first inclined surface 32 and the first bottom surface 31.

In order to prevent the nozzle A from scraping against a printed object printed by the nozzle B during the printing performed by the nozzle B, the length of the nozzle B is longer than the length of the nozzle A (by such as a height difference Δh).

When the moving block 5 slides downwards along the first inclined surface 32 of the first guiding block 3, the printing platform 1 moves down by a height equal to the height difference Δh. At this point, the difference between the height of the nozzle B and the height of the nozzle A is equal to the height difference Δh, and the nozzle B starts to print. Since the nozzle A does not touch the printing platform 1, the nozzle A does not scrape against the printed object printed by the nozzle B.

After the nozzle B finishes printing, the nozzle A is used again for printing by moving the moving block 5 up to the position as shown in FIG. 3 along the first inclined surface 32 of the first guiding block 3 under the external force, and the printing platform 1 moves up by a height equal to the height difference Δh.

In this embodiment, for collaborating with the printings performed by the nozzle A and the nozzle B, the printing platform 1 can move upwards and downwards by using the plane at which the printing platform 1 is located as a reference plane when the nozzle B performs printing. The nozzle B is lifted up by the nozzle adjustment device after the nozzle B finishes printing. When the nozzle A is used for printing, the printing platform 1 moves up by a height equal to the height difference Δh, so as to facilitate the printing by the nozzle A. During the printing by the nozzle A, although the printing platform 1 moves up by a height equal to the height difference Δ h, yet the lifted height of the nozzle B is greater than that of the printing platform 1, so that the nozzle B does not scrape against the material discharged by the nozzle A. After the nozzle A finishes printing, and the nozzle B is moved downwards to carry out printing, the printing platform 1 is moved down by a height equal to the height difference Δh, and the nozzle B is moved downwards by the nozzle adjustment device to carry out printing. Since the printing platform 1 is moved downwards by a height equal to the height difference Δh, the nozzle A does not scrape against the newly injected material, and does not scrape against the material previously injected by the nozzle A.

With reference to the aforementioned nozzle adjustment device, an embodiment of the present disclosure provides a three-dimensional forming equipment assembly which includes a frame, a printing platform, a motor assembly, and a nozzle assembly. The nozzle assembly is connected to the motor assembly. The nozzle assembly includes the aforementioned nozzle adjustment device and at least two nozzles including a first nozzle and a second nozzle.

For the nozzle assembly, the first nozzle is installed on the second bottom surface 53 of the moving block 5 of the nozzle adjustment device, and the second nozzle is fixed and connected to the motor assembly.

With reference to the aforementioned three-dimensional forming equipment assembly, an embodiment of the present disclosure provides a three-dimensional forming method.

The three-dimensional forming method includes the following steps (it is appreciated that the sequence of the steps and the sub-steps as mentioned below, unless otherwise specified, all can be adjusted according to actual needs, or even executed at the same time or partially at the same time):

(1) installing the first nozzle of the nozzle assembly on the second bottom surface 53 of the moving block 5 of the nozzle adjustment device;

(2) adjusting the distance between the second bottom surface 53 of the moving block 5 and the printing platform 1 to be the shortest limiting distance H; and (3) controlling the first nozzle to carry out printing, in which after the first nozzle stops printing, adjusting the distance between the second bottom surface 53 of the moving block 5 and the printing platform 1 to be greater than the shortest limiting distance H, and controlling the second nozzle of the nozzle assembly to carry out printing, in which the second nozzle is fixed and connected to the motor assembly.

The three-dimensional forming equipment assembly provided by the embodiment of the present disclosure can be a three-dimensional printer. However, embodiments of the present disclosure are not limited thereto.

When using three-dimensional forming equipment assembly with multiple nozzles, the nozzle adjustment device and the nozzle adjustment method of the present disclosure have the advantage that the idle nozzle is lifted up during printing. Thus, when the three-dimensional forming equipment assembly and the three-dimensional forming method based on the nozzle adjustment device and the nozzle adjustment method of the present disclosure are applied, the interference between the nozzle and the printed object during the printing process can be effectively avoided. In addition, the material accumulation and the damage caused by the idling nozzles scraping against the printed object are also avoided. In this manner, the surface of the printed object becomes smooth, the quality of the printed object and the printing efficiency are both increased, and both the material and the time for printing are saved in comparison with the prior art.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A nozzle adjustment device for a three-dimensional forming equipment assembly, the nozzle adjustment device comprising:

a first guiding block having a first inclined surface and a first bottom surface which is parallel to a printing platform, the first inclined surface and the first bottom surface forming an acute angle therebetween;

a second guiding block having a second inclined surface; and a moving block located between the first guiding block and the second guiding block, the moving block having a third inclined surface, a fourth inclined surface, and a second bottom surface which is parallel to the printing platform and has a nozzle disposed thereon.

2. The nozzle adjustment device of claim 1, wherein the first inclined surface, the second inclined surface, the third inclined surface, and the fourth inclined surface are parallel to each other, and the third inclined surface contacts the first inclined surface, and the fourth inclined surface contacts the second inclined surface.

3. The nozzle adjustment device of claim 1, further comprising a position-limiting device configured to limit a shortest limiting distance between the second bottom surface of the moving block and the printing platform.

4. The nozzle adjustment device of claim 3, wherein when a distance between the second bottom surface of the moving block and the printing platform is the shortest limiting distance, the nozzle is located at a printing position.

5. The nozzle adjustment device of claim 3, wherein the position-limiting device is a limiting block, a top surface of the limiting block is located above the printing platform by the shortest limiting distance, and when a distance between the second bottom surface of the moving block and the printing platform reaches the shortest limiting distance, the second bottom surface and the top surface of the limiting block are in contact.

6. The nozzle adjustment device of claim 1, further comprising a driving device connected to the moving block and configured to drive a displacement of the moving block between the first guiding block and the second guiding block.

7. The nozzle adjustment device of claim 6, wherein the driving device comprises an electric motor and a driving element driven by the electric motor, and the driving element is connected to the moving block.

8. A nozzle adjustment method for a three-dimensional forming equipment assembly, suitable for use in the nozzle adjustment device of claim 1, the nozzle adjustment method comprising:

controlling a displacement of the moving block between the first guiding block and the second guiding block, so as to allow the nozzle installed on the second bottom surface of the moving block to carry out printing when a distance between the second bottom surface of the moving block and the printing platform is a shortest limiting distance; and moving the moving block between the first guiding block and the second guiding block after the nozzle installed on the second bottom surface of the moving block stops printing, so as to make the distance between the second bottom surface of the moving block and the printing platform greater than the shortest limiting distance.

9. The nozzle adjustment method of claim 8, wherein the nozzle adjustment device comprises a position-limiting device, and when the distance between the second bottom surface of the moving block and the printing platform is the shortest limiting distance, the second bottom surface and a top surface of the position-limiting device are in contact.

10. A three-dimensional forming equipment assembly comprising:
a frame;
a printing platform;
a motor assembly; and
a nozzle assembly connected to the motor assembly, the nozzle assembly comprising:
the nozzle adjustment device of claim 1; and
at least two nozzles including a first nozzle and a second nozzle, the first nozzle defined by the nozzle disposed on the second bottom surface.

11. The three-dimensional printing equipment assembly of claim 10, wherein the second nozzle is fixed and connected to the motor assembly.

* * * * *